(12) United States Patent
Sudo et al.

(10) Patent No.: US 11,635,109 B2
(45) Date of Patent: *Apr. 25, 2023

(54) SLIDING MEMBER

(71) Applicants: TOYOTA JIDOSHA KABUSHIKI KAISHA, Toyota (JP); KYODO YUSHI CO., LTD., Fujisawa (JP)

(72) Inventors: Junichi Sudo, Miyoshi (JP); Youji Kanehara, Nagoya (JP); Koushi Yamada, Odawara (JP); Kenichiro Sakurai, Toyota (JP); Ko Tanimura, Suzuka (JP); Tomonobu Komoriya, Chigasaki (JP)

(73) Assignees: TOYOTA JIDOSHA KABUSHIKI KAISHA, Toyota (JP); KYODO YUSHI CO., LTD., Fujisawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/367,697

(22) Filed: Jul. 6, 2021

(65) Prior Publication Data

US 2022/0018398 A1 Jan. 20, 2022

(30) Foreign Application Priority Data

Jul. 20, 2020 (JP) .............................. JP2020-123885

(51) Int. Cl.
*F16C 33/66* (2006.01)
*C10M 147/04* (2006.01)
(Continued)

(52) U.S. Cl.
CPC ....... *F16C 33/6633* (2013.01); *C10M 125/02* (2013.01); *C10M 147/04* (2013.01);
(Continued)

(58) Field of Classification Search
CPC .................. C10M 147/04; C10M 169/06; C10M 177/00; C10M 125/02; C10M 2211/06;
(Continued)

(56) References Cited

U.S. PATENT DOCUMENTS

2002/0072477 A1 6/2002 Ikejima et al.
2005/0229730 A1 10/2005 Hori et al.
(Continued)

FOREIGN PATENT DOCUMENTS

CN 102105573 A 6/2011
EP 0613939 A2 9/1994
(Continued)

OTHER PUBLICATIONS

Toyota Jidosha Kabushiki Kaisha—U.S. Appl. No. 17/376,684, filed Jul. 15, 2021; Title of Invention: Sliding Member.
(Continued)

*Primary Examiner* — Vishal V Vasisth
(74) *Attorney, Agent, or Firm* — Dickinson Wright, PLLC

(57) ABSTRACT

One aspect of the disclosure relates to a sliding member. The sliding member includes: a first sliding portion having a first lubricant placed between first parts of a first friction sliding mechanism; a second sliding portion having a second lubricant placed between second parts of a second friction sliding mechanism; and a third sliding portion having a third lubricant placed between third parts of a third friction sliding mechanism. The first sliding portion is in contact with the third lubricant, and the second sliding portion is not in contact with the third lubricant. The second lubricant contains an additive containing conductive carbon, and the third lubricant contains no conductive carbon. The second lubricant contains a relatively larger amount of the conductive carbon than the first lubricant.

18 Claims, 4 Drawing Sheets

(51) Int. Cl.
*C10M 125/02* (2006.01)
*C10M 169/06* (2006.01)
*C10N 50/10* (2006.01)
*C10N 40/02* (2006.01)
*C10N 30/00* (2006.01)

(52) U.S. Cl.
CPC .... *C10M 169/06* (2013.01); *C10M 2213/062* (2013.01); *C10N 2030/60* (2020.05); *C10N 2040/02* (2013.01); *C10N 2050/10* (2013.01)

(58) Field of Classification Search
CPC ...... C10M 2201/041; C10M 2213/062; C10M 2215/1026; C10M 2203/1006; C10N 2050/10; C10N 2030/60; C10N 2040/02; C10N 2020/02; C10N 2030/40; C10N 2040/046; C10N 2070/00; C10N 2020/06; C10N 2030/28; F16C 33/6633; F16C 2206/02; F16C 2202/32; F16C 2361/61; F16C 2210/02
See application file for complete search history.

(56) References Cited

U.S. PATENT DOCUMENTS

| | | | |
|---|---|---|---|
| 2007/0196632 A1* | 8/2007 | Meyer | B05D 1/36 |
| | | | 427/430.1 |
| 2007/0265177 A1 | 11/2007 | Michioka et al. | |
| 2008/0146474 A1 | 6/2008 | Takahashi et al. | |
| 2008/0196995 A1 | 8/2008 | Mikami et al. | |
| 2008/0219610 A1 | 9/2008 | Nakatani et al. | |
| 2010/0234254 A1 | 9/2010 | Koshima et al. | |
| 2011/0046027 A1 | 2/2011 | Zhamu et al. | |
| 2011/0111993 A1 | 5/2011 | Shimura et al. | |
| 2017/0275558 A1* | 9/2017 | Saito | C10M 143/02 |
| 2017/0362530 A1 | 12/2017 | Hirooka et al. | |
| 2018/0057768 A1 | 3/2018 | Sakai et al. | |
| 2019/0119595 A1 | 4/2019 | Tanaka et al. | |
| 2019/0300813 A1 | 10/2019 | Shishikura | |
| 2020/0032157 A1 | 1/2020 | Asai et al. | |
| 2021/0348078 A1 | 11/2021 | Haramoto et al. | |
| 2021/0403752 A1 | 12/2021 | Yamasaki | |
| 2022/0017834 A1 | 1/2022 | Sudo et al. | |

FOREIGN PATENT DOCUMENTS

| | | | |
|---|---|---|---|
| JP | 2004169862 A | 6/2004 |
| JP | 2006152092 A | 6/2006 |
| JP | 2010100702 A | 5/2010 |
| JP | 2010100703 A | 5/2010 |
| JP | 2014240676 A | 12/2014 |
| JP | 2020012034 A | 1/2020 |
| JP | 2020117696 A | 8/2020 |
| JP | 2021195015 A | 12/2021 |
| WO | 2010/010789 A1 | 1/2010 |
| WO | 2021/255517 A1 | 12/2021 |

OTHER PUBLICATIONS

Junichi Sudo—Notice of Allowance issued to U.S. Appl. No. 17/364,856 dated Jul. 14, 2022.

Sudo et al., U.S. Appl. No. 17/364,856, filed Jun. 30, 2021.

Sudo et al., Office Action Issued to U.S. Appl. No. 17/364,856 dated Apr. 7, 2022.

Office Action Issued to U.S. Appl. No. 17/364,856 dated Sep. 30, 2022.

Junichi Sudo et al., Office Action Issued to U.S. Appl. No. 17/364,856 dated Feb. 17, 2023.

* cited by examiner

SLIDING MEMBER

CROSS-REFERENCE TO RELATED APPLICATION

This application claims priority to Japanese Patent Application No. 2020-123885 filed on Jul. 20, 2020, incorporated herein by reference in its entirety.

BACKGROUND

1. Technical Field

The disclosure relates to sliding members.

2. Description of Related Art

The body of an automobile is usually always positively charged due to the friction between the tires and the road surface caused when the automobile travels, disturbance, etc. Radio noise generated when this static charge is discharged from the body of the automobile may cause malfunction of electronic devices etc. mounted on the automobile. A technique has therefore been developed in which conductive grease is sealed in wheel bearings to remove static charge via the wheel bearings.

For example, a wheel bearing for an automobile described in Japanese Unexamined Patent Application Publication No. 2004-169862 (JP 2004-169862 A) is characterized by including: an outer bearing ring having an outer ring raceway on its inner peripheral surface; an inner bearing ring having an inner ring raceway on its outer peripheral surface; a plurality of rolling elements rollably arranged between the outer ring raceway and the inner ring raceway; and a cage rollably holding the rolling elements. In this wheel bearing, a grease composition containing, as essential components, base oil, a thickener composed of metal complex soap or a urea compound, and conductive carbon black with an average particle size of less than 2 µm is sealed in the space between the outer ring raceway and the inner ring raceway.

SUMMARY

As described above, lubricants containing a conductive additive such as carbon black in order to remove static charge from a sliding member and a product (e.g., an automobile) equipped with the sliding member, and products using such a lubricant are known in the art. However, these related arts have some problems. The sliding member typically includes a plurality of friction sliding mechanisms. It is preferable to place a lubricant containing a conductive additive for static charge removal in some of the friction sliding mechanisms to give conductive properties to the friction sliding mechanisms. However, it may not be suitable for a lubricant that is placed in others of the friction sliding mechanisms to contain a conductive additive to give conductive properties to the friction sliding mechanisms, in view of predetermined functions other than the static charge removal. In the case where a lubricant containing a conductive additive is placed in a specific friction sliding mechanism to give conductive properties to the friction sliding mechanism, a friction sliding mechanism that is not suitable for being given conductive properties may come into contact with the lubricant in the specific friction sliding mechanism. In this case, the predetermined functions provided by the lubricant in the friction sliding mechanism that is not suitable for being given conductive properties may be impaired.

The disclosure provides a sliding member that makes it possible to remove static charge from the sliding member that is charged during use and a product (e.g., an automobile) equipped with the sliding member and/or to improve driving stability of the product by the static charge removal, and that also makes it possible to efficiently implement functions other than the static charge removal.

Regarding a sliding member including a plurality of sliding portions, the inventors found that, by (i) placing a lubricant containing no conductive carbon in a friction sliding mechanism that is not suitable for being given conductive properties, (ii) placing a lubricant containing either substantially no conductive carbon or a small amount of conductive carbon in another friction sliding mechanism that may come into contact with the lubricant in the friction sliding mechanism that is not suitable for being given conductive properties, and (iii) placing a lubricant containing a relatively larger amount of conductive carbon than the lubricant of (ii) in still another friction sliding mechanism that does not come into contact with the lubricant in the friction sliding mechanism that is not suitable for being given conductive properties, it is possible to remove static charge from the sliding member and a product (e.g., an automobile) equipped with the sliding member and/or to improve driving stability of the product by the static charge removal and it is also possible to efficiently implement functions other than the static charge removal. The inventors completed the disclosure based on the above findings.

(1) An aspect of the present disclosure relates to a sliding member including:

a first sliding portion that has a first friction sliding mechanism having at least two first parts and that has a first lubricant placed between the first parts;

a second sliding portion that has a second friction sliding mechanism having at least two second parts and that has a second lubricant placed between the second parts; and a third sliding portion that has a third friction sliding mechanism having at least two third parts and that has a third lubricant placed between the third parts, wherein the first sliding portion is in contact with the third lubricant, the second sliding portion is not in contact with the third lubricant, the first lubricant contains first base oil and a first additive, the second lubricant contains second base oil and a second additive containing conductive carbon, the third lubricant contains third base oil and a third additive, the third lubricant contains no conductive carbon, and the second lubricant contains a relatively larger amount of the conductive carbon than the first lubricant. At least two of the first base oil, the second base oil, and the third base oil may be the same base oil, or all of the first base oil, the second base oil, and the third base oil may be different base oils.

(2) The first lubricant may not contain the conductive carbon.

(3) The conductive carbon may be selected from the group consisting of carbon black, carbon nanotubes, carbon nanohorns, carbon nanofibers, graphene, and graphite.

(4) The second lubricant may further contain polytetrafluoroethylene as the second additive.

(5) The first lubricant and the second lubricant may further contain a thickener and may be in a form of a grease composition.

(6) The sliding member may be a sliding member for an automobile.

(7) The sliding member may be an electronically controlled differential.

(8) The sliding member may be an electronically controlled coupling.

According to the disclosure, a sliding member is provided that makes it possible to remove static charge from the sliding member that is charged during use and a product (e.g., an automobile) equipped with the sliding member and/or to improve driving stability of the product by the static charge removal, and that also makes it possible to efficiently implement functions other than the static charge removal.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Sliding Member

Figure 1:
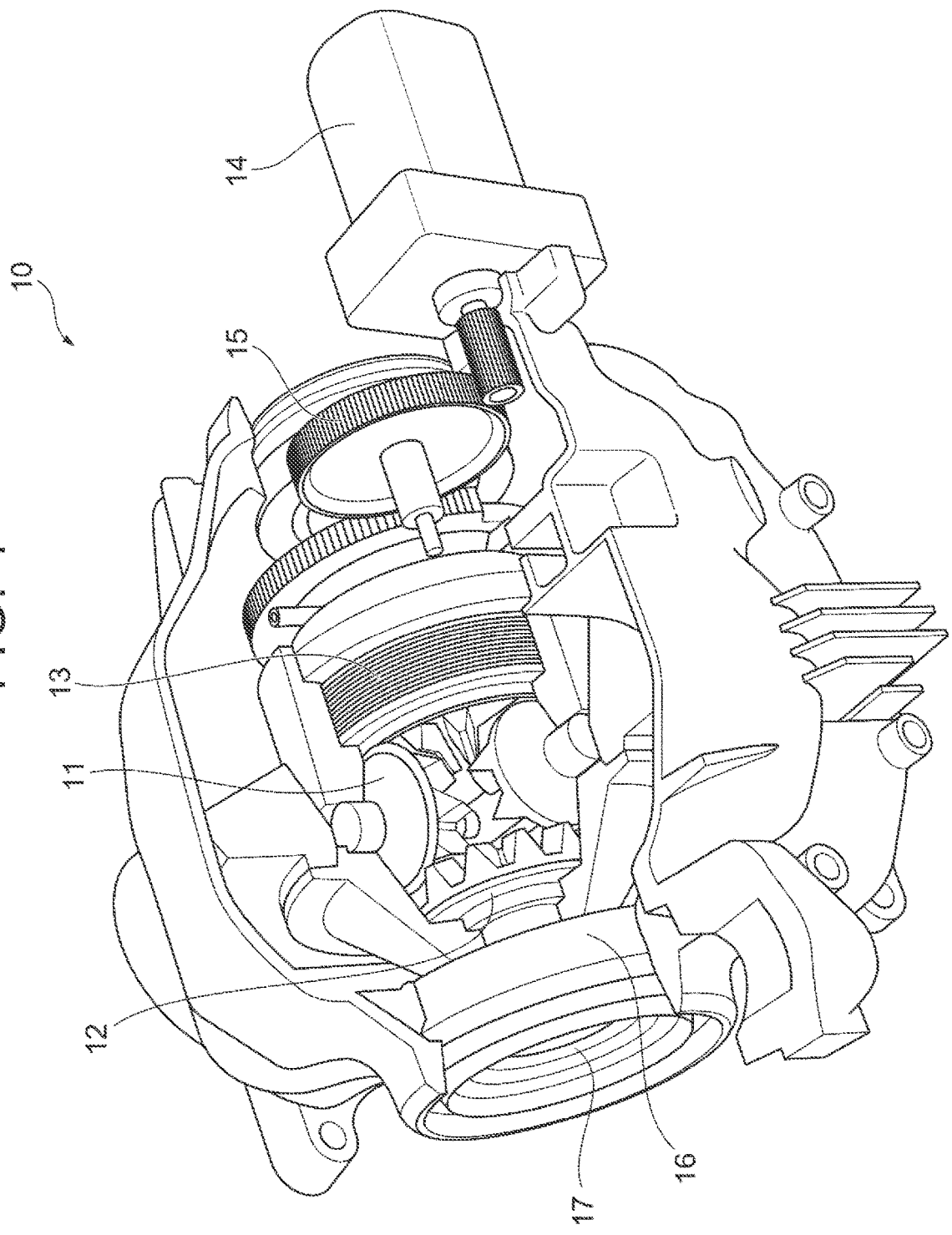
FIG. 1 schematically illustrates an embodiment of a sliding member of an aspect of the disclosure that is an electronically controlled differential.

Regarding a sliding member including a plurality of sliding portions, the inventors found that, by (i) placing a lubricant containing no conductive carbon in a friction sliding mechanism that is not suitable for being given conductive properties, (ii) placing a lubricant containing either substantially no conductive carbon or a small amount of conductive carbon in another friction sliding mechanism that may come into contact with the lubricant in the friction sliding mechanism that is not suitable for being given conductive properties, and (iii) placing a lubricant containing a relatively larger amount of conductive carbon than the lubricant of (ii) in still another friction sliding mechanism that does not come into contact with the lubricant in the friction sliding mechanism that is not suitable for being given conductive properties, it is possible to remove static charge from the sliding member and a product (e.g., an automobile) equipped with the sliding member and/or to improve driving stability of the product by the static charge removal and it is also possible to efficiently implement functions other than the static charge removal. Therefore, one aspect of the disclosure relates to a sliding member.

The sliding member of the aspect includes a first sliding portion, a second sliding portion, and a third sliding portion. The first sliding portion has a first friction sliding mechanism having at least two first parts and has a first lubricant placed between the two first parts. The second sliding portion has a second friction sliding mechanism having at least two second parts and has a second lubricant placed between the two second parts. The third sliding portion has a third friction sliding mechanism having at least two third parts and has a third lubricant placed between the two third parts. The first sliding portion, the second sliding portion, and the third sliding portion are separate members and are disposed at different positions from each other. The sliding member of the aspect may include another sliding portion, as desired, in addition to the first sliding portion, the second sliding portion, and the third sliding portion. The other sliding portion has a friction sliding mechanism having at least two parts and has a lubricant placed between the two parts. The lubricant placed in the other sliding portion may be the first lubricant, the second lubricant, the third lubricant, or another lubricant. Hereinafter, the first parts, the second parts, and the third parts are also simply referred to as parts. The first friction sliding mechanism, the second friction sliding mechanism, and the third friction sliding mechanisms are also simply referred to as friction sliding mechanisms.

In the sliding member of the aspect, the number of first sliding portions, the number of second sliding portions, the number of third sliding portions, and the number of other sliding portions are not limited and can be set as desired independently of each other. For example, the sliding member of the aspect may include one first sliding portion, one second sliding portion, and one third sliding portion, may include one first sliding portion, one second sliding portion, one third sliding portion, and one other sliding portion, or may include one first sliding portion, a plurality of (e.g., two to five) second sliding portions, and one third sliding portion. In an embodiment in which the sliding member includes a plurality of first sliding portions, a plurality of second sliding portions, a plurality of third sliding portions, and/or a plurality of other sliding portions, the first sliding portions may be either the same or different from each other, the second sliding portions may be either the same or different from each other, the third sliding portions may be either the same or different from each other, and the other sliding portions may be either the same or different from each other. In the embodiment in which the sliding member includes the first sliding portions, the second sliding portions, the third sliding portions, and/or the other sliding portions, a plurality of first lubricants placed in the first sliding portions may be either the same or different from each other, a plurality of second lubricants placed in the second sliding portions may be either the same or different from each other, a plurality of third lubricants placed in the third sliding portions may be either the same or different from each other, and a plurality of other lubricants placed in the other sliding portions may be either the same or different from each other.

As will be described below, the sliding member of the aspect need only include the first sliding portion, the second sliding portion, and the third sliding portion in one member that is handled as an integral member. However, even when each of a plurality of members that is used in a specific product application (e.g., an automobile application) includes the first sliding portion, the second sliding portion, and the third sliding portion, the combination of these members is not included in the sliding member of the aspect in the case where these members are handled as separate members. For example, in an automobile, even when a sleeve and splines (e.g., a sleeve and splines of a steering shaft) that frictionally slide on each other include the first sliding portion, an axle rolling bearing (e.g., a hub bearing) includes the second sliding portion, and a plain bearing (e.g., a shaft bearing of an electronically controlled differential) includes the third sliding portion, the combination of these members is not included in the sliding member of the aspect because these members are usually handled as separate members.

In the sliding member of the aspect,
the first lubricant contains first base oil and a first additive,
the second lubricant contains second base oil and a second additive containing conductive carbon,
the third lubricant contains third base oil and a third additive,
the third lubricant contains no conductive carbon, and
the second lubricant contains a relatively larger amount of the conductive carbon than the first lubricant. At least two of the first base oil, the second base oil, and the third base oil may be the same base oil, or all of the first base oil, the second base oil, and the third base oil may be different base oils.

In other words, the first lubricant contains substantially no conductive carbon or contains a relatively smaller amount of the conductive carbon than the second lubricant. The sliding member of the aspect having the above characteristics makes it possible to remove static charge from the sliding member and a product (e.g., an automobile) equipped with the sliding member and/or to improve driving stability of the product by the static charge removal, while substantially reducing or avoiding the possibility that the third lubricant may have conductive properties.

The reason why static charge can be removed from the sliding member and a product (e.g., an automobile) equipped with the sliding member and/or the driving stability of the product can be improved by the static charge removal in each aspect of the disclosure as described above is as follows. Each aspect of the disclosure is not limited to the following functions and principles. The body of an automobile is usually always positively charged due to the friction between the tires and the road surface caused when the automobile travels, disturbance, etc. Air is also usually positively charged. Accordingly, when the automobile travels, an electrostatic repulsive force is generated between the surface of the body of the automobile and the air, and repulsion in the direction away from the automobile is generated for the air flow near the surface of the body of the automobile. The tires of the automobile are also usually positively charged due to contact with the road surface. The silica content of tires has been especially increasing recently due to the growing demand for energy saving tires. Such tires with a high silica content tend to be positively charged. Due to such static charge, the automobile cannot provide desired aerodynamic performance and/or driving performance, and as a result, the driving stability of the automobile may be reduced. In the sliding member of the aspect, the second lubricant containing base oil and a second additive containing conductive carbon is used in the second sliding portion. The positive charge on the surface of the body of the automobile and/or the tires can therefore be removed by the conductive carbon contained in the second lubricant via the second sliding portion. Since the second lubricant is used in the second sliding portion of the sliding member of the aspect, static charge can be removed from the sliding member and a product (e.g., the surface of a body of an automobile and/or tires of the automobile) equipped with the sliding member, and the driving stability of the product (e.g., an automobile) can be improved.

In each aspect of the disclosure, the effect of removing static charge from the sliding member and a product (e.g., the surface of the body of an automobile and/or the tires of the automobile) equipped with the sliding member can be quantitatively measured by, but not limited to, e.g., applying the sliding member of the aspect to an automobile to prepare a test vehicle, measuring a change in potential on the surface of the test vehicle and/or the tires of the test vehicle over time during traveling of the test vehicle by using a non-contact surface potential measurement device (e.g., capable of measuring the surface potentials of the positive and negative electrodes in the range of 0.1 to 5 kV), and comparing the measurement results of the test vehicle with the measurement results of a comparative test vehicle.

In each aspect of the disclosure, the driving stability of the automobile mainly means the stability of dynamic performance related to steering out of the basic dynamic performance of the automobile such as "running, turning, and stopping." The driving stability of the automobile can be defined based on, e.g., the followability and responsiveness of the automobile when the driver of the automobile actively steers the steering wheel, the course keeping capability of the automobile when the driver of the automobile does not actively steer the steering wheel, the convergence properties for external factors such as road surface shape or crosswind, etc. In each aspect of the disclosure, the driving stability of the automobile can be quantitatively measured by, but not limited to, e.g., applying the sliding member of the aspect to an automobile to prepare a test vehicle and evaluating the responsiveness of the test vehicle to maneuvering of the test vehicle. In this method, for example, the maneuvering of the test vehicle can be measured by the steering angle of the steering wheel, and the responsiveness of the behavior of the test vehicle can be measured by the vehicle yaw angular acceleration. The steering angle of the steering wheel can be measured by, e.g., a steering angle sensor or a controller area network (CAN) data logger that is mounted on the vehicle. The vehicle yaw angular acceleration can be measured by, e.g., a gyro sensor etc.

In each aspect of the disclosure, the automobile means a vehicle having four, two, or any other number of rubber wheels (tires) and including a prime mover such as an engine or a motor.

In the sliding member of the aspect,
the first sliding portion is in contact with the third lubricant, and
the second sliding portion is not in contact with the third lubricant.

In other words, there is a possibility that the first lubricant placed in the first sliding portion may come into contact with the third lubricant, while there is substantially no possibility that the second lubricant placed in the second sliding portion may come into contact with the third lubricant.

As described above, the second lubricant that is placed in the second sliding portion contains conductive carbon as an additive in order to remove static charge. On the other hand, it is not necessary or not suitable for the third lubricant that is placed in the third sliding portion to contain conductive carbon as an additive to give conductive properties, in view of predetermined functions other than the static charge removal. In the sliding member of the aspect, there is a possibility that the first lubricant placed in the first sliding portion may come into contact with the third lubricant, while there is substantially no possibility that the second lubricant placed in the second sliding portion may come into contact with the third lubricant. It is therefore possible to substantially reduce or avoid the possibility that the conductive carbon may be mixed with the third lubricant and the third lubricant may have conductive properties. Accordingly, the sliding member of the aspect having the above characteristics can efficiently implement functions other than the static charge removal that are provided by the third lubricant, while substantially reducing or avoiding the possibility that the third lubricant may have conductive properties.

In the sliding member of the aspect, the base oils contained in the first lubricant, the second lubricant, and the third lubricant can be selected as appropriate from various base oils commonly used in the art, such as mineral oils and synthetic oils. The base oils contained in the first lubricant, the second lubricant, and the third lubricant may be either the same or different from each other. The mineral oils contained in the first lubricant, the second lubricant, and the third lubricant may be either paraffinic mineral oils or naphthenic mineral oils, and are preferably paraffinic mineral oils. It is preferable that the mineral oils be mineral oils manufactured by combining, as appropriate, one or more desired refining means selected from, e.g., vacuum distillation, solvent deasphalting, solvent extraction, hydrocracking, solvent dewaxing, sulfuric acid cleaning, clay refining, hydrorefining, etc. The synthetic oils contained in the first lubricant, the second lubricant, and the third lubricant may be any of known synthetic oils such as hydrocarbon synthetic oils like poly-α-olefin oils using 1-decene as a starting material and co-oligomer oils of α-olefin and ethylene, phenyl ether synthetic oils, ester synthetic oils, polyglycol synthetic oils, and silicone oils, and are preferably hydrocarbon synthetic oils consisting only of carbon and hydrogen atoms.

The base oil may be composed of any of the mineral oils and synthetic oils mentioned above or may be a mixture of two or more of the mineral oils and/or synthetic oils. The base oil preferably consists only of mineral oil. In the case of using the base oil consisting only of mineral oil, the cost can be reduced. Since the first lubricant, the second lubricant, and the third lubricant contain such base oil as described above, the first lubricant, the second lubricant, and the third lubricant exhibit desired fluidity when placed in the first sliding portion, the second sliding portion, and the third sliding portion in the sliding member of the aspect, respectively.

In the sliding member of the aspect, the base oils contained in the first lubricant, the second lubricant, and the third lubricant preferably have a kinematic viscosity in the range of 40 to 200 $mm^2/s$, and more preferably in the range of 60 to 100 $mm^2/s$, at 40° C. When the kinematic viscosity of the base oil is lower than the lower limit of the above range, there is a possibility that an oil film may not sufficiently be formed between the parts of the friction sliding mechanism of the first sliding portion, the second sliding portion, and/or the third sliding portion in which the lubricant is used and that the sliding surfaces of the parts of the friction sliding mechanism may be damaged. When the kinematic viscosity of the base oil is higher than the upper limit of the above range, there is a possibility that the viscous resistance of the first lubricant, the second lubricant, and the third lubricant may increase and an increase in torque or heat generation may be caused between the parts of the friction sliding mechanism of the first sliding portion, the second lubricant, and/or the third sliding portion in which the lubricant is used. Accordingly, when the first lubricant, the second lubricant, and the third lubricant in the sliding member of the aspect contains base oil having a kinematic viscosity of the above range, an oil film is sufficiently formed between the parts of the friction sliding mechanism of the first sliding portion, the second sliding portion, and/or the third sliding portion in which the lubricant is used, and the first lubricant, the second lubricant, and the third lubricant exhibit desired fluidity.

In each aspect of the disclosure, the kinematic viscosity of the base oil etc. can be measured based on, but not limited to, e.g., JIS K 2283 using a glass capillary viscometer.

In the sliding member of the aspect, the first lubricant contains substantially no conductive carbon or contains a relatively smaller amount of conductive carbon than the second lubricant. It is preferable that the first lubricant contain substantially no conductive carbon. When the first lubricant contains a relatively smaller amount of conductive carbon than the second lubricant, the content of the conductive carbon in the first lubricant is preferably in the range of 0.1 to 10 mass %, more preferably in the range of 0.5 to 8 mass %, and even more preferably in the range of 2 to 8 mass %, based on the total mass of the first lubricant. Alternatively, the upper limit of the content of the conductive carbon in the first lubricant may be set to the lower limit of the content of the conductive carbon in the second lubricant. In this case, the content of the conductive carbon in the first lubricant is preferably in the range of 0.01 to 2 mass %, more preferably in the range of 0.01 to 0.5 mass %, and even more preferably in the range of 0.01 to 0.1 mass %, based on the total mass of the first lubricant. As described above, in the sliding member of the aspect, the first sliding portion is in contact with the third lubricant. Accordingly, there is a possibility that the first lubricant placed in the first sliding portion may come into contact with the third lubricant. However, since the first lubricant contains substantially no conductive carbon or contains only a relatively smaller amount of conductive carbon than the second lubricant, the possibility that the conductive carbon may be mixed with the third lubricant and the third lubricant may have conductive properties can be substantially reduced or avoided. Since the first lubricant contains substantially no conductive carbon or has the conductive carbon content of the above range, the sliding member of the aspect having the above characteristics can efficiently implement functions other than the static charge removal that are provided by the third lubricant, while substantially reducing or avoiding the possibility that the third lubricant may have conductive properties.

In the sliding member of the aspect, the second lubricant contains conductive carbon as an additive, and the second lubricant contains a relatively larger amount of the conductive carbon than the first lubricant. The content of the conductive carbon in the second lubricant is preferably in the range of 0.1 to 15 mass %, more preferably in the range of 0.5 to 10 mass %, and even more preferably in the range of 2 to 8 mass %, based on the total mass of the second lubricant. When the content of the conductive carbon in the second lubricant is lower than the lower limit of the above range, there is a possibility that the second lubricant may not have enough conductive properties and static charge may not be sufficiently removed from a product (e.g., the surface of a body of an automobile and/or the tires of the automobile) that uses the sliding member of the aspect. When the content of the conductive carbon in the second lubricant is higher than the upper limit of the above range, there is a possibility that the second lubricant may have reduced fluidity and may not sufficiently spread between the parts of the friction sliding mechanism of the second sliding portion in which the second lubricant is used. The driving stability of a product (e.g., an automobile) that uses the sliding member of the aspect can therefore be improved by placing the second lubricant with the conductive carbon content of the above range between the parts of the friction sliding mechanism of the second sliding portion.

In the sliding member of the aspect, the third lubricant contains substantially no conductive carbon. Since the third lubricant contains substantially no conductive carbon, the sliding member of the aspect having the above characteristics can efficiently implement functions other than the static charge removal that are provided by the third lubricant.

In the sliding member of the aspect, when the first lubricant contains conductive carbon, the conductive carbons contained in the first lubricant and the second lubricant may be either the same or different from each other. The conductive carbon can be selected as appropriate from various materials that are commonly used as a conductive material. The conductive carbon is preferably at least one material selected from the group consisting of carbon black, carbon nanotubes, carbon nanohorns, carbon nanofibers, graphene, and graphite, and is more preferably carbon black. The shape of the conductive carbon can be selected as appropriate from various shapes that are commonly used for a conductive material. The primary particle size of the conductive carbon is preferably in the range of 1 to 100 nm, and more preferably in the range of 5 to 50 nm. The driving stability of a product (e.g., an automobile) that uses the sliding member of the aspect can further be improved by placing the first lubricant and the second lubricant, each containing the conductive carbon having the above characteristics, between the parts of the friction sliding mechanism of the first sliding portion and between the parts of the friction sliding mechanism of the second sliding portion, respectively, or by particularly placing the second lubricant containing the conductive carbon having the above characteristics between the parts of the friction sliding mechanism of the second sliding portion.

In the sliding member of the aspect, it is preferable that the first lubricant and/or the second lubricant further contain polytetrafluoroethylene (PTFE) as an additive. When the first lubricant and the second lubricant contain PTFE, the PTFEs contained in the first lubricant and the second lubricant may be either the same or different from each other. PTFE is known to be a substance that tends to be negatively charged. Accordingly, as the first lubricant and/or the second lubricant, particularly the second lubricant, contains PTFE as an additive in the embodiment, positive charge on a product (e.g., the surface of a body of an automobile and/or the tires of the automobile) that uses the lubricants can be neutralized, and static charge can thus be removed from the surface of the body of the automobile and/or the tires of the automobile.

In the embodiment, the particle size of the PTFE is not particularly limited. The average particle size of the PTFE in particle size distribution is preferably in the range of 0.5 to 50 μm, and more preferably in the range of 1 to 15 μm. The content of the PTFE is preferably in the range of 0.1 to 15 mass %, more preferably in the range of 0.5 to 10 mass %, and even more preferably in the range of 1 to 8 mass %, based on the total mass of the first lubricant or the second lubricant. When the content of the PTFE is lower than the lower limit of the above range, there is a possibility that static charge may not be sufficiently removed from a product (e.g., the surface of a body of an automobile and/or the tires of the automobile) that uses the sliding member of the embodiment. When the content of the PTFE is higher than the upper limit of the above range, there is a possibility that the first lubricant and/or the second lubricant may have reduced fluidity and may not sufficiently spread in the first sliding portion and/or the second sliding portion in which the first lubricant and/or the second lubricant is used. The driving stability of a product (e.g., an automobile) that uses the sliding member of the aspect can further be improved by placing the first lubricant and/or the second lubricant, each containing the PTFE having the above characteristics, between the parts of the friction sliding mechanism of the first sliding portion and/or between the parts of the friction sliding mechanism of the second sliding portion, or by particularly placing the second lubricant containing the PTFE having the above characteristics between the parts of the friction sliding mechanism of the second sliding portion.

In the sliding member of the aspect, the first lubricant, the second lubricant, and/or the third lubricant may contain, as desired, one or more additional additives that are commonly used in the art. When the first lubricant, the second lubricant, and the third lubricant contain one or more additional additives, the one or more additional additives contained in the first lubricant, the one or more additional additives contained in the second lubricant, and the one or more additional additives contained in the third lubricant may be either the same or different from each other. Examples of the additional additives include, but are not limited to, solid additives other than carbon black and PTFE (e.g., molybdenum disulfides, graphite, or melamine cyanurate (MCA)), extreme pressure agents (e.g., olefin sulfides, sulfurized esters, or sulfurized oils and fats), anti-wear agents (e.g., phosphate esters, acidic phosphate esters, acidic phosphate ester amine salts, zinc dithiophosphates, or zinc dithiocarbamates), oil agents (e.g., alcohols, amines, esters, or animal and plant oils and fats), antioxidants (e.g., phenolic antioxidants or amine antioxidants), rust inhibitors (e.g., fatty acid amine salts, zinc naphthenate, or metal sulfonates), and metal inactivating agents (e.g., benzotriazoles or thiadiazoles). When the first lubricant, the second lubricant, and/or the third lubricant contains additional additive(s), the additional additive(s) may be any of the additives mentioned above or may be a mixture of two or more of the additives.

In the sliding member of the aspect, it is preferable that the first lubricant, the second lubricant, and/or the third lubricant further contain a thickener, and it is more preferable that the first lubricant and/or the second lubricant further contain a thickener. In the case of the embodiment, the first lubricant, the second lubricant, and/or the third lubricant containing the thickener can be in the form of a semi-solid or solid grease composition. The thickener can be selected as appropriate from various materials that are commonly used in the art such as a soap material and a non-soap material. An example of the soap material is lithium soap. Examples of the non-soap material include an organic material such as a diurea compound or fluorine powder and an inorganic material such as silica powder, titania, alumina, or carbon fibers. In each aspect of the disclosure, the diurea compound is usually a compound represented by the following formula (I).

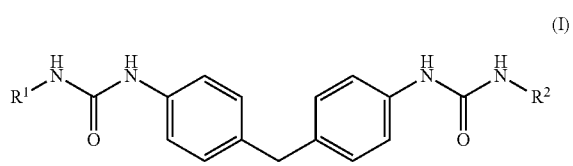

(I)

In formula (I), $R^1$ and $R^2$ are preferably substituted or unsubstituted $C_6$ to $C_{20}$ alkyls or substituted or unsubstituted $C_6$ to $C_{18}$ aryls, more preferably substituted or unsubstituted $C_6$ to $C_{18}$ aryls, and even more preferably substituted or unsubstituted phenyls, independently of each other, and it is particularly preferable that both $R^1$ and $R^2$ are 4-methylphenyl. In each aspect of the disclosure, the diurea compound represented by the above formula (I), where $R^1$ and $R^2$ are substituted or unsubstituted $C_6$ to $C_{18}$ aryls independently of each other, are sometimes referred to as an "aromatic diurea compound." In the case of the embodiment, the thickener contained in the first lubricant and/or the second lubricant is preferably a diurea compound or lithium soap, or a mixture thereof, more preferably a diurea compound, and even more preferably an aromatic diurea compound. Since the first lubricant, the second lubricant, and/or the third lubricant contains such a thickener, the first lubricant, the second lubricant, and/or the third lubricant can exhibit high fluidity in the sliding member of the embodiment.

It is preferable that the thickener be contained in the first lubricant, the second lubricant, and/or the third lubricant in such an amount that the worked penetration of the first lubricant, the second lubricant, and/or the third lubricant in the sliding member of the embodiment is in the range of 220 to 385. It is more preferable that the worked penetration be in the range of 265 to 340. The content of the thickener that meets the above requirement is usually in the range of 2 to 30 mass %, typically in the range of 3 to 25 mass %, and particularly in the range of 4 to 20 mass %, based on the total mass of the first lubricant, the second lubricant, and/or the third lubricant. When the content of the thickener is higher than the upper limit of the above range in the sliding member of the embodiment, there is a possibility that the first lubricant, the second lubricant, and/or the third lubricant may not sufficiently spread in the first sliding portion, the second sliding portion, and/or the second sliding portion in which the first lubricant, the second lubricant, and/or the third lubricant is used. When the content of the thickener is lower than the lower limit of the above range in the sliding member of the embodiment, there is a possibility that the first lubricant, the second lubricant, and/or the third lubricant may be excessively softened and may leak from the first sliding portion, the second sliding portion, and/or the third sliding portion. Accordingly, when the first lubricant, the second lubricant, and/or the third lubricant contains the thickener with the worked penetration of the above range in the sliding member of the embodiment, the first lubricant, the second lubricant, and/or the third lubricant will not leak from the first sliding portion, the second sliding portion, and/or the third sliding portion and can exhibit desired fluidity.

For example, the worked penetration of the first lubricant, the second lubricant, and/or the third lubricant can be measured based on HS K 2220 7.

In the sliding member of the aspect, the third lubricant may be in the form of a grease composition containing the thickener described above, or in the form of oil containing substantially no thickener. In each aspect of the disclosure, the lubricant in the form of oil may be referred to as the "lubricating oil."

The sliding member of the aspect can be used in any desired application such as an automobile or a diesel locomotive. It is preferable that the sliding member of the aspect be a sliding member for an automobile. By using the sliding member of the aspect in the above application, static charge can be removed from the sliding member that is charged during use and a product (e.g., the surface of the body of an automobile and/or the tires of the automobile) equipped with the sliding member and/or the driving stability of the product can be improved by the static charge removal, and functions other than the static charge removal can also be efficiently implemented.

In the sliding member of the aspect, the functions other than the static charge removal that are provided by the third lubricant include, e.g., reducing wear of the sliding member. The sliding member of the aspect makes it possible to remove static charge from the sliding member that is charged during use and a product (e.g., the surface of the body of an automobile and/or the tires of the automobile) equipped with the sliding member and/or to improve the driving stability of the product by the static charge removal, and also makes it possible to efficiently implement functions other than the static charge removal.

The sliding member of the aspect can be applied to various members with a friction sliding mechanism. In one embodiment, it is preferable that the sliding member of the aspect be an electronically controlled differential. In the embodiment, the electronically controlled differential is usually mounted on an automobile. FIG. 1 schematically illustrates an embodiment of the sliding member of the aspect that is an electronically controlled differential. As shown in FIG. 1, an electronically controlled differential 10 includes a differential pinion gear 11, an oil chamber 12 housing the differential pinion gear 11, a multi-disc clutch 13, a motor 14, a reduction gear 15, a shaft bearing 16, and an oil seal 17. In the electronically controlled differential of the embodiment, the numbers of differential pinion gear, oil chambers, multi-disc clutches, motors, reduction gears, shaft bearings, and oil seals and the arrangement of these components are not limited to those shown in the figure. The electronically controlled differential of the embodiment may include any numbers of differential pinion gear, oil chambers, multi-disc clutches, motors, reduction gears, shaft bearings, and oil seals, and these components may be arranged in any manner. In the electronically controlled differential 10 of the embodiment, the oil seal 17 is the first sliding portion. The motor 14 and the reduction gear 15 are the second sliding portions. The shaft bearing 16 is the third sliding portion. The first lubricant is placed on a friction sliding surface of the oil seal 17 that is the first sliding portion. The second lubricant is placed on a rotary shaft and bearing of the motor 14 that is the second sliding portion and on the reduction gear 15 that is the second sliding portion. The third lubricant is placed on a friction sliding surface of the shaft bearing 16 that is the third sliding portion. The lubricant in the form of oil (that is, lubricating oil) is placed in the oil chamber 12. It is preferable that the first lubricant and the second lubricant be in the form of a grease composition. The third lubricant may be in the form of a grease composition, or the lubricating oil placed in the oil chamber 12 may be supplied as the third lubricant. Since the oil seal 17 that is the first sliding portion is in contact with the third lubricant placed on the friction sliding surface of the shaft bearing 16, there is a possibility that the first lubricant placed on the friction sliding surface of the oil seal 17 may come into contact with the third lubricant. On the other hand, since the motor 14 and the reduction gear 15, which are the second sliding portions, are not in contact with the third lubricant placed on the friction sliding surface of the shaft bearing 16, there is substantially no possibility that the second lubricant placed on the rotary shaft and bearing of the motor 14 and on the reduction gear 15 may come into contact with the third lubricant. It is therefore possible to substantially reduce or avoid the possibility that the conductive carbon may be mixed with the third lubricant and the third lubricant may have conductive properties. By using the sliding member of the aspect that is an electronically controlled differential, static charge can be removed from a product (e.g., an automobile) and/or the driving stability of the product can be improved by the static charge removal, and functions other than the static charge removal can also be efficiently implemented.

Figure 2:
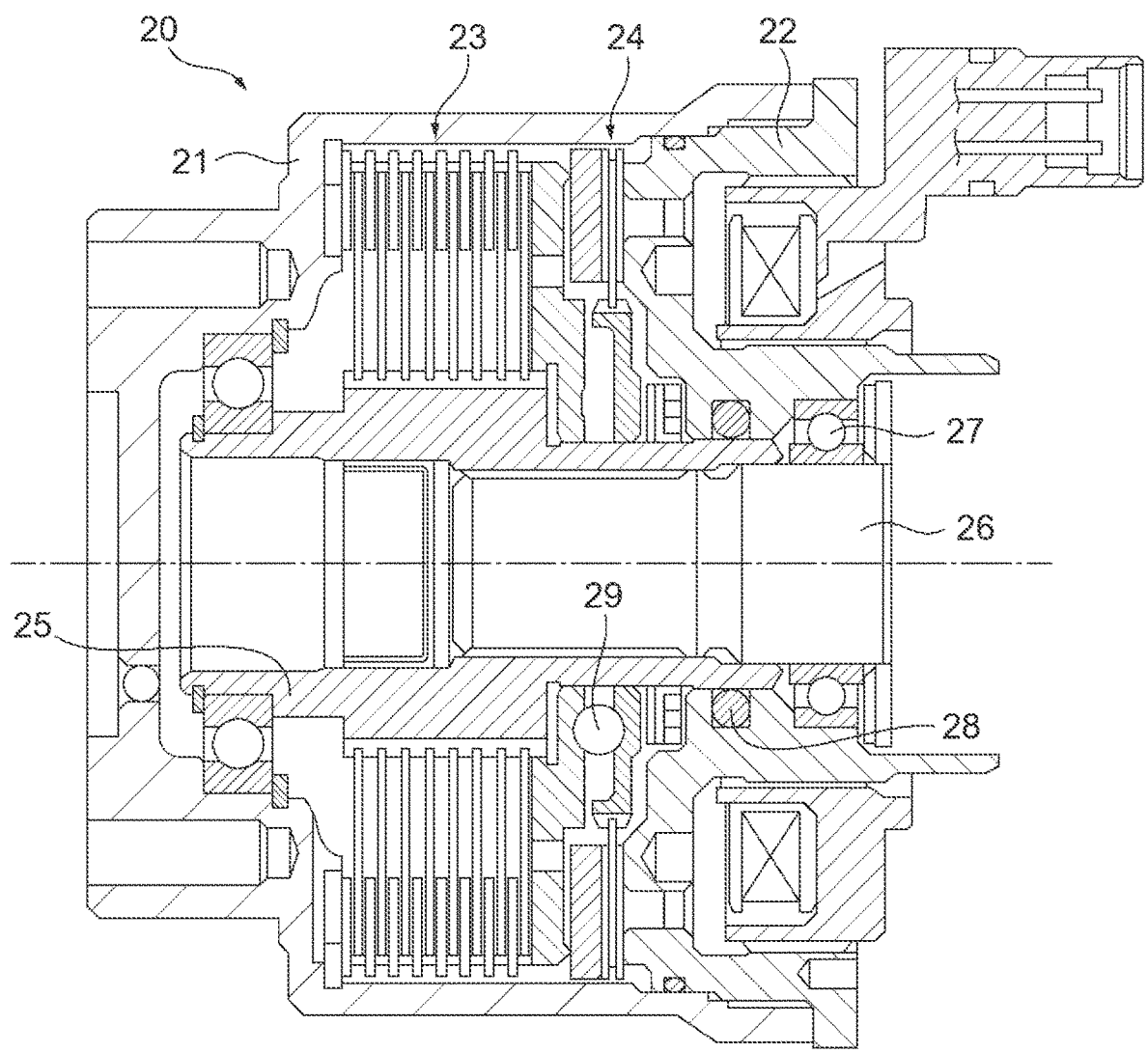
FIG. 2 schematically illustrates an embodiment of the sliding member of the aspect of the disclosure that is an electronically controlled coupling.

In another embodiment, it is preferable that the sliding member of the aspect be an electronically controlled coupling. In the embodiment, the electronically controlled coupling is usually mounted on an automobile. FIG. 2 schematically illustrates an embodiment of the sliding member of the aspect that is an electronically controlled coupling. As shown in FIG. 2, an electronically controlled coupling 20 includes a first housing 21, a second housing 22 placed radially inside the first housing 21, a multi-disc clutch 23, an electromagnetic clutch 24, a power transmission shaft 25, an output shaft 26, a bearing 27 of the output shaft 26, an oil seal 28, and a bearing 29 of the power transmission shaft 25. These components of the electronically controlled coupling 20 rotate together about a rotation axis. The space surrounded by the first housing 21 and the second housing 22 serves as an oil chamber. The electronically controlled coupling 20 optimizes the torques on the front and rear wheels by adjusting the torques on the power transmission shaft 25 and the output shaft 26 by the multi-disc clutch 23 and the electromagnetic clutch 24. In the electronically controlled coupling of the embodiment, the numbers of first housings, second housings, multi-disc clutches, electromagnetic clutches, power transmission shafts, output shafts, bearings of the output shaft, oil seals, and bearings of the power transmission shaft and the arrangement of these components are not limited to those shown in the figure. The electronically controlled coupling of the embodiment may include any numbers of first housings, second housings, multi-disc clutches, electromagnetic clutches, power transmission shafts, output shafts, bearings of the output shaft, oil seals, and bearings of the power transmission shaft, and these components may be arranged in any manner. In the electronically controlled coupling 20 of the embodiment, the oil seal 28 is the first sliding portion. The bearing 27 of the output shaft 26 is the second sliding portion. The bearing 29 of the power transmission shaft 25 is the third sliding portion. The first lubricant is placed on a friction sliding surface of the oil seal 28 that is the first sliding portion. The second lubricant is placed on a friction sliding surface of the bearing 27 that is the second sliding portion. The third lubricant is placed on a friction sliding surface of the bearing 29 that is the third sliding portion. The lubricant in the form of oil (that is, lubricating oil) is placed in the oil chamber surrounded by the first housing 21 and the second housing 22. It is preferable that the first lubricant and the second lubricant be in the form of a grease composition. The third lubricant may be in the form of a grease composition, or the lubricating oil placed in the oil chamber may be supplied as the third lubricant. Since the oil seal 28 that is the first sliding portion is in contact with the third lubricant placed on the friction sliding surface of the bearing 29, there is a possibility that the first lubricant placed on the friction sliding surface of the oil seal 28 may come into contact with the third lubricant. On the other hand, since the bearing 27 that is the second sliding portion is not in contact with the third lubricant placed on the friction sliding surface of the bearing 29, there is substantially no possibility that the second lubricant placed on the bearing 27 may come into contact with the third lubricant. It is therefore possible to substantially reduce or avoid the possibility that the conductive carbon may be mixed with the third lubricant and the third lubricant may have conductive properties. By using the sliding member of the aspect that is an electronically controlled differential, static charge can be removed from a product (e.g., an automobile) and/or the driving stability of the product can be improved by the static charge removal, and functions other than the static charge removal can also be efficiently implemented.

2. Manufacturing Method of Sliding Member

Another aspect of the disclosure relates to a method for manufacturing the sliding member of the above aspect of the disclosure. The method of the aspect includes a sliding portion preparation step, a sliding portion placement step, a lubricant preparation step, and a lubricant placement step.

In the method of the aspect, the sliding portion preparation step includes: preparing the first sliding portion that has a first friction sliding mechanism having at least two first parts; preparing the second sliding portion that has a second friction sliding mechanism having at least two second parts; and preparing the third sliding portion that has a third friction sliding mechanism having at least two third parts. This step may optionally further include preparing another sliding portion that has a friction sliding mechanism having at least two parts.

In this step, the first sliding portion, the second sliding portion, the third sliding portion, and the other sliding portion may be prepared by producing the member having a predetermined shape and structure or may be prepared by, e.g., purchasing the member having a predetermined shape and structure.

In the method of the aspect, the sliding portion placement step includes: placing the third sliding portion in a product (e.g., an automobile) to be equipped with the sliding member that is manufactured by the method of the aspect; placing the first sliding portion at a position where the first sliding portion can come into contact with the third lubricant placed between the at least two third parts in the third friction sliding mechanism of the third sliding portion; and placing the second sliding portion at a position where the second sliding portion cannot come into contact with the third lubricant placed between the at least two third parts in the third friction sliding mechanism of the third sliding portion. This step may optionally include placing the other sliding portion at a desired position.

In the method of the aspect, the lubricant preparation step includes: preparing the first lubricant containing first base oil and a first additive; preparing the second lubricant containing second base oil and a second additive containing conductive carbon and containing a relatively larger amount of the conductive carbon than the first lubricant; and preparing the third lubricant containing third base oil and a third additive and containing no conductive carbon. This step may optionally include preparing another lubricant containing base oil and an additive.

This step can be performed by mixing components of each lubricant using kneading means that is commonly used in the art, such as roll mills, Flyma mills, Charlotte mills, or homogenizers. In this step, the order in which the components are mixed is not particularly limited. For example, the additive and optionally a thickener may be simultaneously added to the base oil and mixed together or may be added separately (e.g., successively or at a predetermined time interval) to the base oil and mixed together.

In the method of the aspect, the lubricant placement step includes: placing the first lubricant between the at least two first parts in the first friction sliding mechanism of the first sliding portion; placing the second lubricant between the at least two second parts in the second friction sliding mechanism of the second sliding portion; and placing the third lubricant between the at least two third parts in the third friction sliding mechanism of the third sliding portion. This step may optionally include placing the other lubricant between the at least two parts in the friction sliding mechanism of the other sliding portion.

3. Method for Improving Driving Stability of Product Equipped with Sliding Member Still another aspect of the disclosure relates to a method for improving the driving stability of a product (e.g., an automobile) equipped with the sliding member of the above aspect of the disclosure. The method of the aspect includes: applying the third lubricant between the at least two third parts in the third friction sliding mechanism of the third sliding portion; applying the first lubricant between the at least two first parts in the first friction sliding mechanism of the first sliding portion placed at the position where the first sliding portion can come into contact with the third lubricant; applying the second lubricant between the at least two second parts in the second friction sliding mechanism of the second sliding portion placed at the position where the second sliding portion cannot come into contact with the third lubricant. The method of the aspect may optionally include applying the other lubricant between the at least two parts in the friction sliding mechanism of the other sliding portion placed at the desired position. The first lubricant, the second lubricant, and the third lubricant that are used in the method of the aspect and the other lubricant that is optionally used in the method of the aspect are the lubricants described above.

By carrying out the method of the aspect, the driving stability of a product (e.g., an automobile) equipped with the sliding member of the aspect of the disclosure can be improved while efficiently implementing functions other than static charge removal.

The disclosure will be described in more detail with reference to examples. However, the technical scope of the disclosure is not limited to the examples.

I: Preparation of Lubricants

Lubricants of Example 1 and Comparative Example 1 were prepared in the form of a grease composition by adding a thickener (aromatic diurea compound, a reaction product of 4,4'-diphenylmethane diisocyanate and p-toluidine), carbon black (primary particle size: 10 to 20 nm), polytetrafluoroethylene (PTFE, average particle size in particle size distribution: 5 μm), and other additives (antioxidant, rust inhibitor, and anti-wear agent) to base oil (paraffinic mineral oil, kinematic viscosity: 75 mm²/s (40° C.)) and kneading the resultant mixture with three roll mills. The structure of the aromatic diurea compound is shown below. Table 1 shows the content of each component in the lubricants of Example 1 and Comparative Example 1. In the table, the content of each component is shown in mass % based on the total mass of the lubricant.

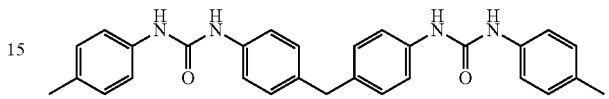

TABLE 1

|  |  | Example 1 | Comparative Example 1 |
|---|---|---|---|
| Base Oil |  | Balance | Balance |
| Thickener |  | 4 | 20 |
| Additive | Carbon Black | 5.0 | 0 |
|  | PTFE | 5.0 | 0 |
|  | Others | 1.8 | 1.8 |

II: Lubricant Performance Evaluation

Worked Penetration Measurement Test

The worked penetration of the lubricants of Example 1 and Comparative Example 1 was measured based on JIS K 2220 7. The measurement results show that the lubricants of Example 1 and Comparative Example 1 had a worked penetration of 300.

Driving Stability Measurement Test

The lubricants of Example 1 and Comparative Example 1 were sealed in axle rolling bearings (made by JTEKT Corporation, hub units with a double row angular contact ball bearing). The axle rolling bearings were attached to the four wheels, namely front and rear right and left wheels, of test vehicles. Table 2 shows the specifications of the test vehicles.

TABLE 2

| Example/ Comparative Example | Vehicle | Vehicle Model | L/O | Outline of Specifications | Hub Unit Bearing | Tires |
|---|---|---|---|---|---|---|
| Example 1 | RX450h | GYL25W-AWXGB(L) | '16/8 | 3.5L-HV Xe-4WD | Lubricant of Example 1 | Standard Products 235/55/R20 |
| Comparative Example 1 |  |  |  |  | Lubricant of Comparative Example 1 |  |

Figure 3:
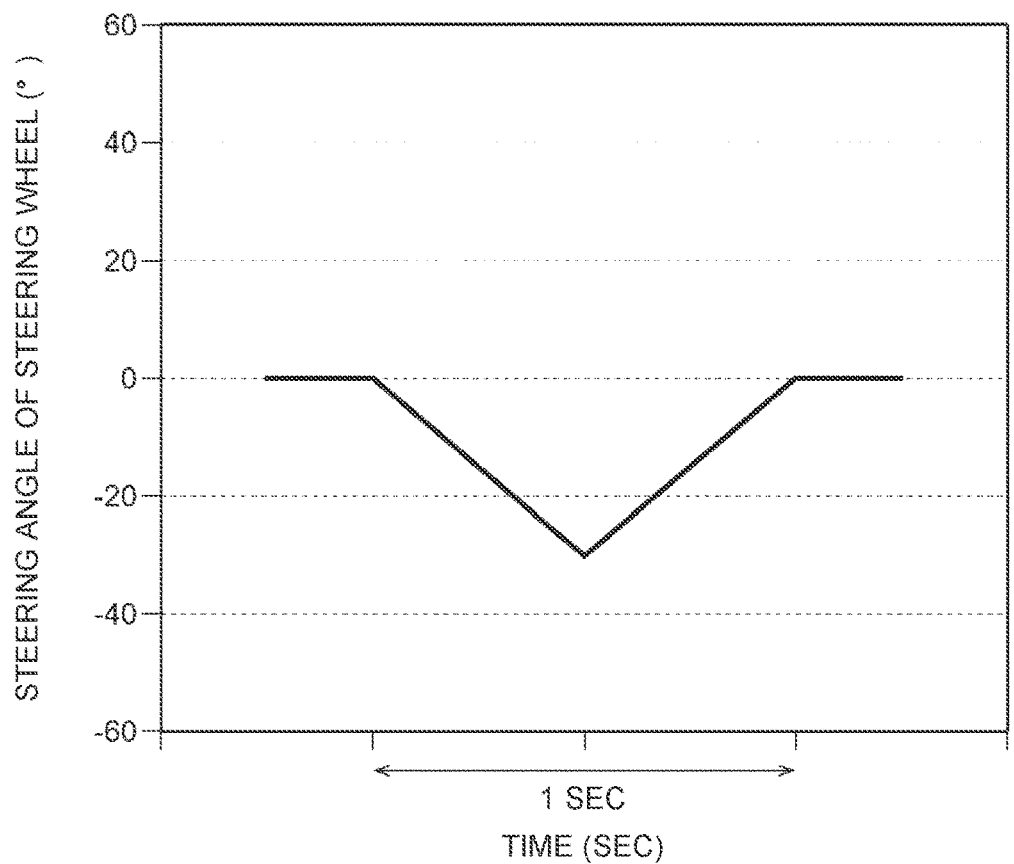
FIG. 3 is a graph showing a change in steering angle of a steering wheel over time during a lane change in a driving stability measurement test.

The test vehicles of Example 1 and Comparative Example 1 were run at 70 km/h. During traveling of the test vehicles, a lane change was repeatedly made based on a steering method for lane changes shown in FIG. 3. In the steering method shown in FIG. 3, the steering angle of a steering wheel is changed from 0° to −30° and back to 0° in one second (hereinafter, this change in steering angle of the steering wheel is also referred to as the "60°/sec steering angle of the steering wheel"). The steering angle of the steering wheel and the vehicle yaw angular acceleration of the test vehicles of Example 1 and Comparative Example 1 were measured in the above running test. The steering angle of the steering wheel was measured by a steering angle sensor and a CAN data logger that were mounted on the vehicle. The vehicle yaw angular acceleration was measured by a gyro sensor (NAV440CA-200 made by Crossbow Technology Inc.).

Figure 4:
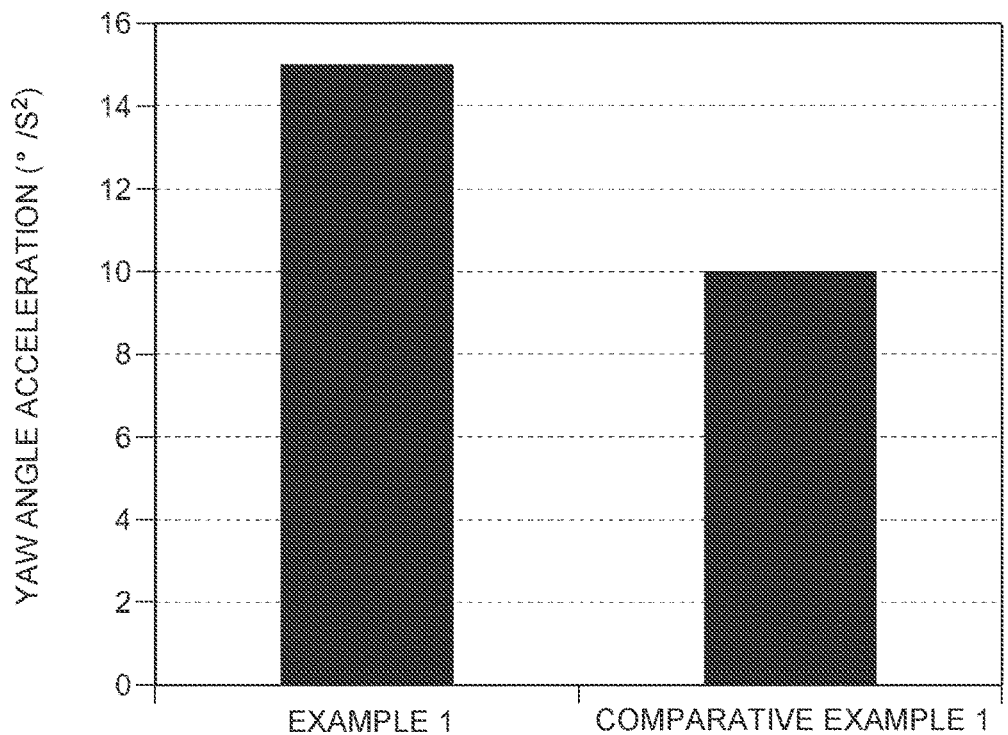
FIG. 4 is a graph showing the values of vehicle yaw angle acceleration of test vehicles of Example 1 and Comparative Example 1 for the 60°/sec steering angle of the steering wheel.

Responsiveness of the behavior of the test vehicles to maneuvering of the test vehicles was evaluated in order to quantitatively measure the driving stability of the test vehicles. In this test, the maneuvering of the test vehicles was measured by the steering angle of the steering wheel, and the responsiveness of the behavior of the test vehicles was measured by the vehicle yaw angular acceleration. FIG. 4 shows the values of the vehicle yaw angle acceleration of the test vehicles of Example 1 and Comparative Example 1 for the 60°/sec steering angle of the steering wheel.

As shown in FIG. 4, the value of the vehicle yaw angular acceleration of the test vehicle of Example 1 was significantly higher than the value of the vehicle yaw angular acceleration of the test vehicle of Comparative Example 1. This result shows that the use of the lubricant of Example 1 improved the responsiveness of the behavior of the test vehicle to the steering of the steering wheel of the test vehicle, and as a result, improved the driving stability of the test vehicle.

Measurement Test of Static Charge Removal Effect from Vehicle Body

A lubricant of Example 2 was prepared under conditions similar to those for the lubricant of Example 1 except that the content of the thickener was 3 mass %, the content of carbon black was 5 mass %, the content of PTFE was 10 mass %, and the content of other additives was 1.8 mass %, and the content of the base oil was the balance. A test vehicle was prepared under conditions similar to those described above using the lubricant of Example 2.

Figure 5A:
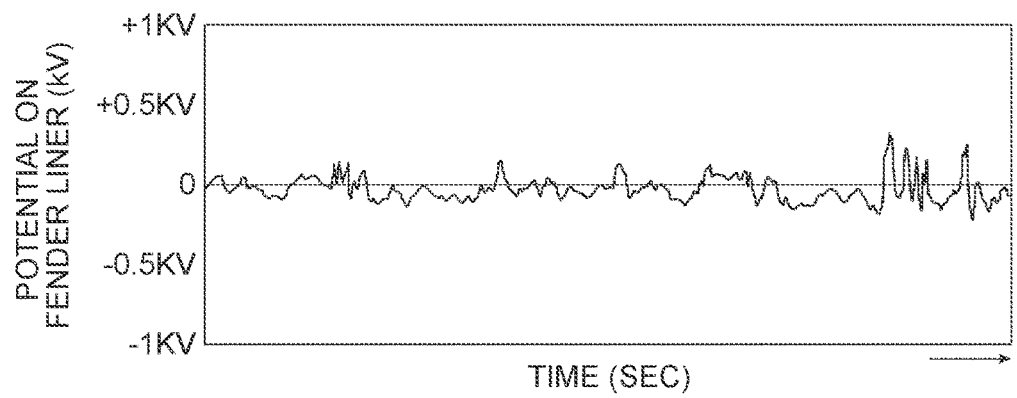
FIG. 5A is a graph showing a change in potential on a fender liner over time during traveling of the test vehicle of Comparative Example 1.
Figure 5B:
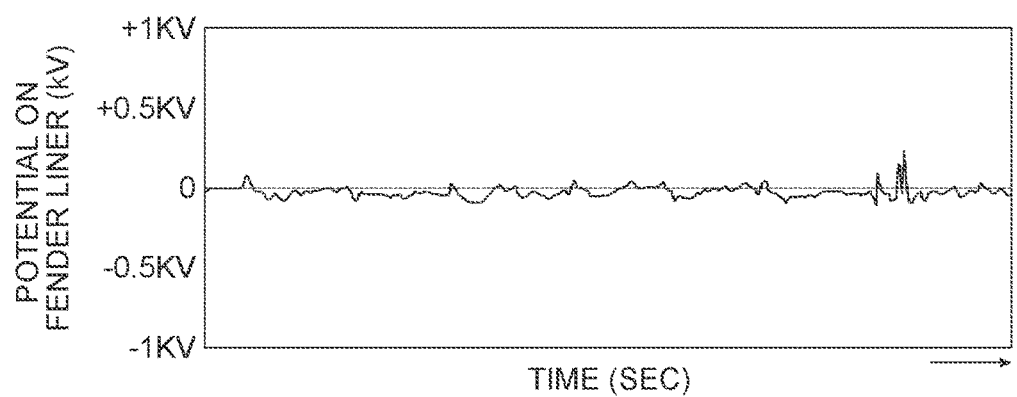
FIG. 5B is a graph showing a change in potential on a fender liner over time during traveling of a test vehicle of Example 2.

The test vehicles of Example 2 and Comparative Example 1 were run at about 100 km/h from the start of the test vehicles. During traveling of the test vehicles, the potential on a tire tread surface of a rear part of the left rear wheel and the potential on a fender liner (a part facing the tire tread surface) were measured using a non-contact surface potential measuring device (capable of measuring the surface potentials of the positive and negative electrodes in the range of 0.1 to 5 kV). FIGS. 5A and 5B show a change in potential on the fender liner over time. FIG. 5A shows the measurement results of the test vehicle of Comparative Example 1, and FIG. 5B shows the measurement results of the test vehicle of Example 2. In FIGS. 5A and 5B, the abscissa represents the elapsed time (sec) and the ordinate represents the potential (kV).

As shown in FIG. 5A, the potential fluctuated in the range of +0.34 to −0.24 kV in the test vehicle of Comparative Example 1. On the other hand, as shown in FIG. 5B, the potential fluctuated in the range of +0.09 to −0.12 kV in the test vehicle of Example 2. The above results show that the use of the lubricant of Example 2 reduced the fluctuations in potential on the vehicle body during traveling of the vehicle to about ⅓ as the positive potential on the vehicle body and/or static charge on the tires was removed.

Measurement Test of Voltage Drop Time of Lubricants

Figure 6:
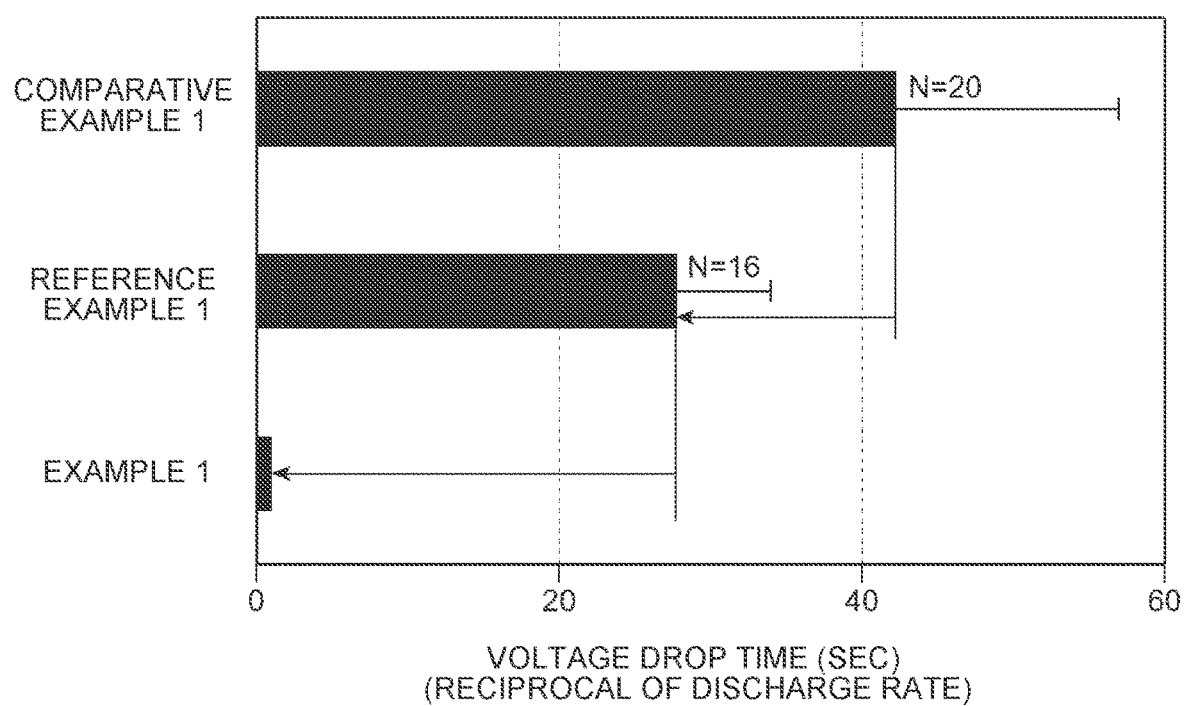
FIG. 6 is a graph showing the voltage drop time (the reciprocal of the discharge rate), which is an index of the discharge rate, of lubricants of Example 1, Reference Example 1, and Comparative Example 1 as measured using a discharge characteristic evaluation device.

A lubricant of Reference Example 1 was prepared under conditions similar to those for the lubricant of Example 1 except that the content of the thickener was 19 mass %, the content of PTFE was 5 mass %, the content of other additives was 1.8 mass %, and the content of the base oil was the balance. A measurement test of the voltage drop time was carried out for the lubricants of Example 1, Reference Example 1, and Comparative Example 1 by using a discharge characteristic evaluation device. The voltage drop time is an index of the discharge rate. Each lubricant was sandwiched between a pair of electrodes and forcibly (positively) charged in a non-contact manner from the surface of one of the electrodes, and the amount of static charge was measured in a non-contact manner (static voltage). The time it took for the static voltage to drop to 0.2 kV or less was measured, and the measured value was used as the voltage drop time. FIG. 6 is a graph illustrating the voltage drop time (the reciprocal of the discharge rate), which is an index of the discharge rate, of each of the lubricants of Example 1, Reference Example 1, and Comparative Example 1. The voltage drop time was measured using the discharge characteristic evaluation device.

As shown in FIG. 6, the average value of the voltage drop time of the lubricant of Comparative Example 1 (containing neither PTFE nor carbon black) was 42.2 seconds. On the other hand, the average value of the voltage drop time of the lubricant of Reference Example 1 (containing PTFE) was 27.6 seconds. The above results show that static charge was neutralized by using the lubricant of Reference Example 1. The average value of the voltage drop time of the lubricant of Example 1 (containing PTFE and carbon black) was within 1.0 second. The above results show that static charge was further neutralized by using the lubricant of Example 1.

What is claimed is:

1. A sliding member, comprising:
    a first sliding portion that has a first friction sliding mechanism having at least two first parts and that has a first lubricant placed between the first parts;
    a second sliding portion that has a second friction sliding mechanism having at least two second parts and that has a second lubricant placed between the second parts; and
    a third sliding portion that has a third friction sliding mechanism having at least two third parts and that has a third lubricant placed between the third parts, wherein:
    the first sliding portion is in contact with the third lubricant;
    the second sliding portion is not in contact with the third lubricant;
    the first lubricant contains first base oil and a first additive;
    the second lubricant contains second base oil and a second additive containing conductive carbon;
    the third lubricant contains third base oil and a third additive;
    the third lubricant contains no conductive carbon; and
    the second lubricant contains a relatively larger amount of the conductive carbon than the first lubricant.

2. The sliding member according to claim 1, wherein the first lubricant contains no conductive carbon.

3. The sliding member according to claim 1, wherein the first lubricant contains 0.1 to 10 mass % of the conductive carbon based on total mass of the first lubricant.

4. The sliding member according to claim 3, wherein the first lubricant contains 0.5 to 8 mass % of the conductive carbon based on the total mass of the first lubricant.

5. The sliding member according to claim 4, wherein the first lubricant contains 2 to 8 mass % of the conductive carbon based on the total mass of the first lubricant.

6. The sliding member according to claim 1, wherein the first lubricant contains 0.01 to 2 mass % of the conductive carbon based on total mass of the first lubricant.

7. The sliding member according to claim 6, wherein the first lubricant contains 0.01 to 0.5 mass % of the conductive carbon based on the total mass of the first lubricant.

8. The sliding member according to claim 7, wherein the first lubricant contains 0.01 to 0.1 mass % of the conductive carbon based on the total mass of the first lubricant.

9. The sliding member according to claim 1, wherein the second lubricant contains 0.1 to 15 mass % of the conductive carbon based on total mass of the second lubricant.

10. The sliding member according to claim 9, wherein the second lubricant contains 0.5 to 10 mass % of the conductive carbon based on the total mass of the second lubricant.

11. The sliding member according to claim 10, wherein the second lubricant contains 2 to 8 mass % of the conductive carbon based on the total mass of the second lubricant.

12. The sliding member according to claim 1, wherein the conductive carbon is selected from the group consisting of carbon black, carbon nanotubes, carbon nanohorns, carbon nanofibers, graphene, and graphite.

13. The sliding member according to claim 1, wherein the second lubricant further contains polytetrafluoroethylene as the second additive.

14. The sliding member according to claim 1, wherein the first lubricant and the second lubricant further contain a thickener and are in a form of a grease composition.

15. The sliding member according to claim 1, wherein the sliding member is a sliding member for an automobile.

16. The sliding member according to claim 15, wherein the sliding member is an electronically controlled differential.

17. The sliding member according to claim 15, wherein the sliding member is an electronically controlled coupling.

18. The sliding member according to claim 1, wherein the first lubricant, the second lubricant and the third lubricant are greases, and have respective worked penetrations in the range of 220 to 385.

* * * * *